Dec. 29, 1936.  H. R. RICARDO  2,066,228
INTERNAL COMBUSTION ENGINE OF THE LIQUID FUEL INJECTION TYPE
Filed May 8, 1934   2 Sheets-Sheet 1
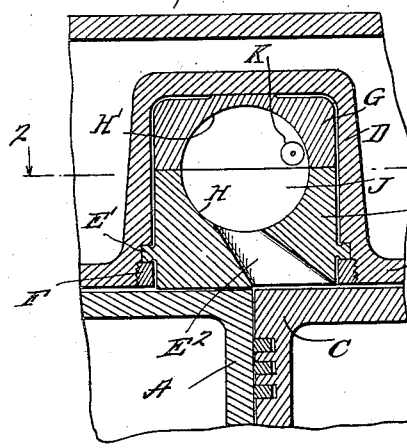
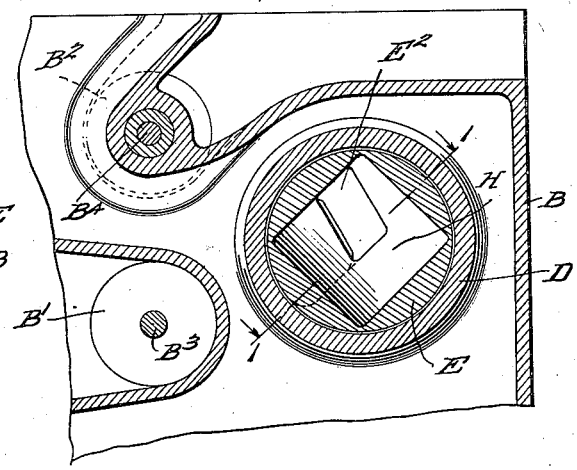
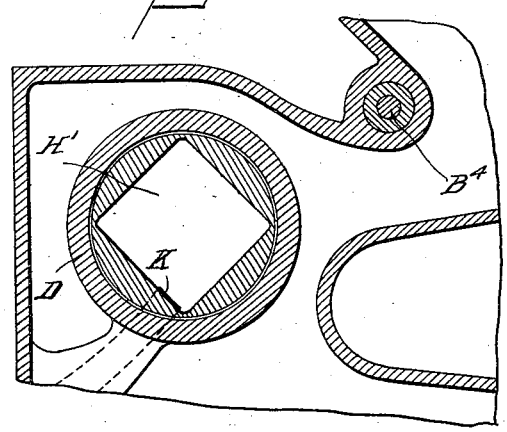
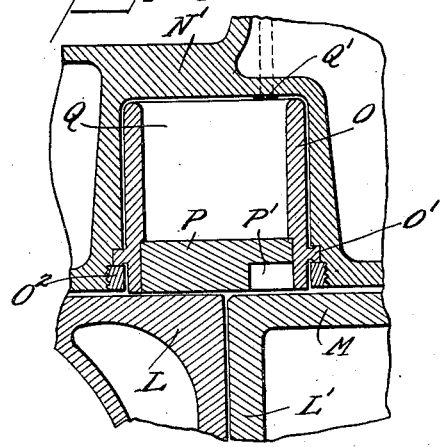
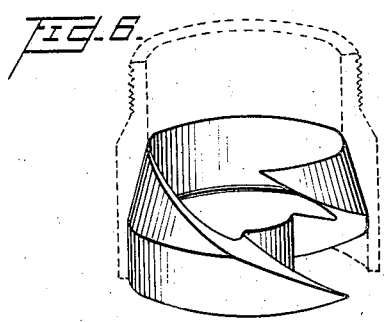
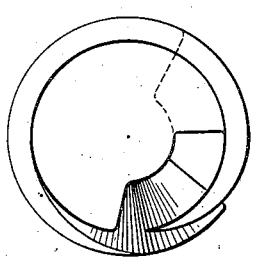
Inventor
Harry R. Ricardo,
By Watson, Coit, Morse & Grindle
Attorneys

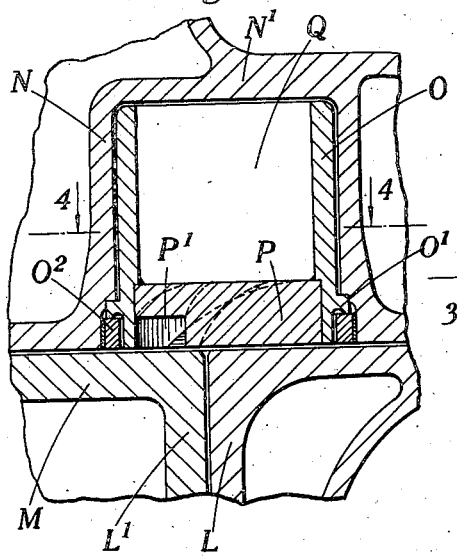
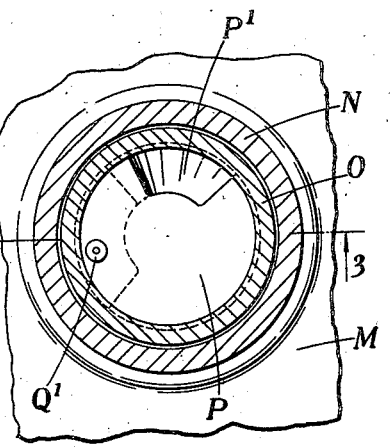
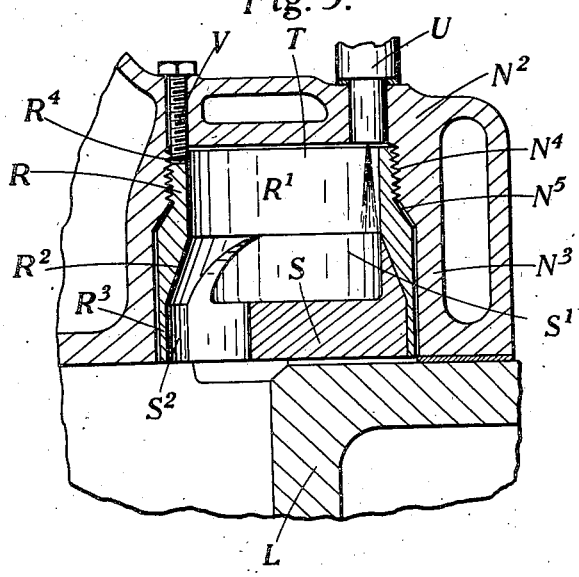

Patented Dec. 29, 1936

2,066,228

UNITED STATES PATENT OFFICE 2,066,228

INTERNAL COMBUSTION ENGINE OF THE LIQUID FUEL INJECTION TYPE

Harry Ralph Ricardo, London, England

Application May 8, 1934, Serial No. 724,583
In Great Britain May 15, 1933

5 Claims. (Cl. 123—32)

This invention relates to internal combustion engines of the liquid fuel injection compression ignition type having in the cylinder head a combustion chamber pocket which constitutes the major portion of the compression space of the engine at the end of the compression stroke and in the wall of which is mounted a fuel sprayer which injects fuel into an air charge forced into the pocket during the compression stroke and has for its object to provide an improved engine of the above kind.

In an internal combustion engine of the above kind according to the present invention a throat member is mounted in the part of the pocket adjacent to the cylinder bore so as to form part of the wall of the combustion chamber and is so arranged that the flow of heat from this throat member to the adjacent cooled part or parts is restricted, the pocket and the throat member together making a combustion chamber having an approximately circular cross-section about an axis and end walls the minimum distance between which is at least two-thirds of the mean diameter of the combustion chamber, while a communicating passage between the cylinder bore and the combustion chamber is so formed in the throat member that the air charge forced therethrough during the compression stroke will be heated and enter the combustion chamber in a direction such that the charge in the combustion chamber at the end of the compression stroke will be in a state of rotation as a whole about the said axis, a fuel injection device being mounted in a cooled part of the wall of the pocket at a point substantially displaced from the axis and adapted to deliver into the combustion chamber a jet or jets of fuel the mean direction of which is either parallel to or makes an angle of less than 45° with a line parallel to the said axis.

Preferably the formation of the pocket and the throat member is such as to provide a combustion chamber of approximately cylindrical form, the length of this chamber measured along the axis thereof being, for example, approximately equal to its diameter. Alternatively, however, the circumferential wall of the combustion chamber may be somewhat barrel-shaped, frusto-conical, bell-shaped or may have an inner surface which is somewhat convex in cross-sections in planes containing the axis, while the end walls of the combustion chamber may either be substantially flat or somewhat concave or convex.

Conveniently the walls of the pocket are either air-cooled or liquid-cooled while the transference of heat from the hot throat member to the cooled part surrounding it is maintained low by arranging this member so as to have limited contact with the adjacent cooled parts.

The fuel sprayer conveniently has a single orifice and is adapted to deliver a single jet of fuel, while in any of the above constructions one or more additional uncooled members or liners may be provided in the pocket adjacent to the parts of the wall thereof not lying directly adjacent to the throat member, such uncooled members also being arranged so that the flow of heat to the adjacent cooled walls is restricted. Thus the major portion or substantially the whole of the wall of the combustion chamber may be constituted by uncooled members so as to assist efficient combustion and generally improve the operation of the engine.

The arrangement and form of the combustion chamber pocket, the throat member and other parts may vary, but two constructions according to this invention are illustrated somewhat diagrammatically by way of example in the accompanying drawings, in which Figure 1 is a sectional elevation of part of the upper end of the cylinder, piston and cylinder head of an engine according to this invention, the section being taken on the line 1—1 of Figure 2, Figure 1a is a section on line 2—2 of Figure 1, looking upwardly.

Figure 2 is a section on the line 2—2 of Figure 1,

Figure 3 is a similar view to Figure 1 of an alternative construction according to this invention, the section being taken on the line 3—3 of Figure 4, Figure 4 is a section on the line 4—4 of Figure 3, Figure 4a is a vertical section on line 4a—4a of Figure 4.

Figure 5 is a similar view to Figures 1 and 3 of a modification of the construction shown in Figure 3.

Figure 6 is a perspective of the plug-like member S of Figure 5, and

Figure 7 is a plan view of the member S of Figure 5.

In the construction shown in Figures 1 and 2 the engine comprises a cylinder indicated at A the upper end of which is closed by a cylinder head B in which are formed inlet and exhaust ports indicated at $B^1$, $B^2$ controlled by poppet valves $B^3$, $B^4$. Reciprocating within the cylinder is a piston C the head of which is adapted at the end of its instroke to lie in close proximity to the cylinder head B.

Also formed in the cylinder head is a cooled pocket D of generally cylindrical form, this pocket being disposed with its axis parallel to the cylinder axis and with its mouth lying partly to one side of and overlapping the cylinder bore so as to open into the cylinder bore, as shown in Figure 1.

Disposed in the mouth of the pocket D is an uncooled plug-like throat member E of generally cylindrical external form, the major portion of the circumferential surface of which lies adjacent to but is spaced by a small distance from the adjacent part of the circumferential wall of the pocket, while a narrow flange $E^1$ formed on the outer circumferential surface of the throat member E engages a seating in the mouth of the pocket in engagement with which it is retained by a screwthreaded ring F formed, for example, of some non-ferrous ductile metal such as brass. Thus the flow of heat from the throat member E to the wall of the pocket D is restricted by reason of the small area of contact between these parts.

Arranged in the inner end of the pocket D so as substantially to fill the part of the pocket not occupied by the throat member E and to abut against this throat member, is a second plug-like member G also arranged so that at least the major portion of its outer surface is spaced by a small distance from the adjacent cooled walls of the pocket D.

Formed in the abutting faces of the throat member E and the member G are part-cylindrical recesses H, $H^1$ together forming a substantially cylindrical combustion chamber J the axis of which conveniently lies in a plane at right angles to the axis of the cylinder and of the pocket D.

Also formed in the throat member E is a passage $E^2$ constituting a communication between the bore of the cylinder A and the interior of the combustion chamber J, the direction of this passage being approximately tangential to a circle having for centre the axis of the cylindrical combustion chamber J so that the air charge forced through this passage during the compression stroke of the piston C will enter the combustion chamber J in such a manner as to cause the charge in the combustion chamber at the end of the compression stroke to be in a state of rotation about the axis thereof.

Preferably the part-cylindrical recesses H, $H^1$ in the throat member E and the plug G are such that the ends of the cylindrical combustion chamber J as well as the circumferential wall thereof are formed by parts of the members E and G as shown in Figure 2.

Mounted in the circumferential wall of the pocket D is a fuel sprayer K the axis of which is parallel to the axis of the cylindrical combustion chamber J but is displaced from the axis of this combustion chamber so as to lie adjacent to a part of the cylindrical wall of the combustion chamber, an aperture being formed in the plug G through which the jet from this sprayer can pass into the combustion chamber.

In the alternative construction illustrated in Figures 3 and 4 the engine comprises a cylinder L the outer end of which is closed by a cylinder head M in which may be formed inlet and exhaust ports controlled by poppet valves arranged similarly to those in the constructions shown in Figures 1 and 2.

The cylinder L contains a reciprocating piston $L^1$ the head of which at the end of its instroke is adapted to approach the cylinder head closely.

Also formed in the cylinder head M is a cooled pocket N of generally cylindrical form, this pocket being disposed with its axis parallel to the cylinder axis and so that its mouth lies partly to one side of and partly overlaps the cylinder bore. Disposed within the pocket N is a cylindrical uncooled lining member O formed, for example, of heat-resisting steel and having a length approximately equal to the length of the pocket, while the diameter of the major portion of its outer circumferential surface is somewhat less than the diameter of the inner circumferential surface of the pocket so that the major portion of the circumference of the member O lies adjacent to but is spaced by a small distance from the cooled circumferential wall of the pocket. Formed on and projecting from the outer circumferential surface of the member O is a narrow flange $O^1$ which engages a seating in the circumferential wall of the pocket and is held in place against such seating by a ring $O^2$ formed, for example, of brass or other ductile non-ferrous metal, the flange $O^1$ constituting the only contact between the uncooled member O and the cooled wall of the pocket N. Mounted within part of the member O lying adjacent to the mouth of the pocket is a plug-like member P which fits tightly within the member O and is itself uncooled. Formed in the circumferential wall of the plug-like member P is a deep helical groove $P^1$ which with the adjacent part of the cylindrical member O forms a helical passage one end of which opens into the cylinder bore while the other opens into the substantially cylindrical combustion chamber Q formed between the inner end of the pocket N, the circumferential wall of the uncooled cylindrical member O and the hot plug P so that when an air charge is forced through the helical passage $P^1$ during the compression stroke this charge will enter the combustion chamber Q in such a direction that at the end of the compression stroke the whole charge in the combustion chamber will be in a state of rotation about the axis thereof.

Arranged in the end wall $N^1$ of the combustion chamber pocket at a point adjacent to the circumference of the combustion chamber Q, for example as indicated at $Q^1$ in Figure 4, is a sprayer adapted to deliver a single jet of fuel in a direction substantially parallel to the axis of the cylindrical combustion chamber and towards the inner surface of the plug P, the disposition of the sprayer and the form of the fuel jet preferably being such that no fuel will be directed towards the open inner end of the helical passage but this fuel will all be directed towards a part of the inner surface of the plug displaced from the inner end of the passage.

In the modified construction shown in Figures 5, 6 and 7, the construction is somewhat similar to that shown in Figures 3 and 4. In the construction shown in Figure 5, however, the cylinder head, which in this construction is designated $N^2$, has formed therein a cooled pocket $N^3$ of generally cylindrical form the mouth of which lies partly to one side of but overlaps the cylinder bore while the circumferential wall of the pocket $N^3$ comprises a cylindrical portion adjacent to the cylinder bore of somewhat greater diameter than a second short cylindrical portion $N^4$ adjacent to the upper closed end of the pocket, the larger diameter cylindrical portion being connected to the smaller diameter cylindrical portion by a short intermediate frusto-conical portion $N^5$, as shown.

Formed on the interior of the portion $N^4$ is a screwthread which is engaged by a corresponding screwthread on the exterior of the upper end part of an uncooled tubular liner R. The length of the liner is approximately equal to the length of the pocket $N^3$ and the part of this liner lying below the screwthreaded portion is so constructed that its outer circumferential surface lies adjacent to but is spaced by a small distance from the corresponding part of the inner circumferential surface of the wall of the pocket $N^3$ so that contact between the tubular liner R and the cooled wall surrounding it is confined to the screwthreaded portion. The liner R is so formed that its internal circumferential surface comprises a cylindrical part $R^1$ of smaller diameter lying adjacent to the upper end of the liner and a frusto-conical part $R^2$ lying intermediate in its length and connecting the part $R^1$ to a part $R^3$ of larger internal diameter adjacent to the lower end of the liner.

Rigidly mounted within the lower end portion of the liner constituted by the parts $R^2$ and $R^3$ is an uncooled plug-like member S the outer circumferential surface of which lies in contact with the inner circumferential surface of the liner. Formed in the upper surface of the member S is a shallow cylindrical recess $S^1$ of approximately the same diameter as the internal diameter of the part $R^1$ so that the part $R^1$ of the liner and the recess $S^1$ in the plug S together form a combustion chamber T of substantially cylindrical form having a length approximately equal to its diameter.

Formed in the circumferential portion of the plug S is a slot $S^2$ of generally helical form which, with the parts $R^2$ and $R^3$, forms a passage communicating at its lower end with the bore of the cylinder L and at its upper end with the combustion chamber T and is so shaped that the air charge forced therethrough during the compression stroke will enter the combustion chamber in such a manner that the charge in the combustion chamber at the end of the compression stroke will be rotating about the axis thereof.

Mounted in the upper wall of the pocket $N^2$ at a point displaced from the axis of the combustion chamber T and conveniently adjacent to its circumferential wall is a fuel sprayer U adapted to deliver a jet of fuel in a direction substantially parallel to the axis of the combustion chamber.

A bolt V in a screwthreaded bore in the end of the pocket $N^2$ engages a notch $R^4$ in the upper end of the member R so as to lock it from rotation.

In this construction the end of the throat which opens into the cylinder is shown with its edge displaced somewhat inwards from the circumference of the cylinder bore. In most cases, however, this edge preferably lies close to or coincident with the circumference of the cylinder bore. Further, the sprayer is for convenience shown displaced circumferentially somewhat from the position it occupies in a preferred arrangement, namely a position relative to the inner end of the throat corresponding to that shown in Figure 3.

It is to be understood that the constructions more particularly described above are given by way of example only and that the form of the combustion chamber and of the hot uncooled throat member as well as of other uncooled members in the combustion chamber where such are provided, the type of sprayer and other details of construction may be modified without departing from this invention, while although in the constructions more particularly described a single sprayer is employed, two or more sprayers may in some cases be used, each sprayer being arranged in the manner set forth or the mean direction of jets from the sprayers as a whole conforming to the requirements specified. Further, the invention may be applied to engines operating on the two-stroke or four-stroke cycle and having inlet and exhaust ports controlled by poppet valves, one or more sleeve valves or other types of valve, or, in the case of two-stroke cycle engines, ports situated in the cylinder wall and controlled by the piston. Again, the proportion of the whole air charge which is forced into the combustion chamber may vary and may be dependent to some extent on clearances necessary for mechanical reasons and other considerations.

What I claim as my invention and desire to secure by Letters Patent is:—

1. An internal combustion engine of the liquid fuel injection compression ignition type, including in combination a cylinder, a cylinder head containing a combustion chamber pocket having cooled walls, a plug-like throat member mounted in that part of the pocket adjacent to the cylinder bore and having limited contact with the adjacent cooled wall so that the flow of heat from the throat member to this wall is restricted, the throat member and the pocket being so formed as to provide a combustion chamber within the pocket having an approximately circular cross-section about an axis and end walls the minimum distance between which is at least two-thirds of the mean diameter of the combustion chamber, said chamber having a volume which is not less than 5/6 of the volume of a truly cylindrical chamber the length and diameter of which are equal respectively to the maximum length and maximum diameter of said combustion chamber, a communicating passage between the combustion chamber and the cylinder bore being so formed in the throat member that the air charge forced therethrough during the compression stroke will be heated and enter the combustion chamber in a direction which will cause the charge in the combustion chamber at the end of the compression stroke to be in a state of rotation as a whole about the said axis, and a fuel injection device mounted in a cooled wall of the pocket at a point substantially displaced from the said axis and delivering into the combustion chamber a fuel spray the mean direction of which makes an angle of less than 45° with a line parallel to the said axis.

2. An internal combustion engine of the liquid fuel injection compression ignition type, including in combination a cylinder, a cylinder head containing a combustion chamber pocket having cooled walls, a plug-like throat member mounted in the part of the pocket adjacent to the cylinder bore and so as to have limited contact with the adjacent cooled wall and thus restrict the flow of heat from the throat member to such cooled wall, a lining member lying adjacent to at least a portion of the cooled wall of the pocket not shielded by the throat member and also having limited contact with the cooled wall, the throat member, the pocket and the lining member being so formed as to provide a combustion chamber having a substantially circular cross-section about an axis and end walls the minimum distance between which is at least two-thirds of the mean diameter of the combustion chamber, said chamber having a volume which is not less than 5/6 of the volume of a truly cylindrical chamber the length and diameter of which are equal respectively to the maximum length and maximum diameter of said combustion chamber, a communicating passage between the combustion chamber and the cylinder bore being so formed in the throat member that the air charge forced therethrough during the compression stroke will be heated and enter the combustion chamber in a direction which will cause the charge in the combustion chamber at the end of the compression stroke to be in a state of rotation as a whole about the said axis, and a fuel injection device mounted in a cooled wall of the pocket at a point substantially displaced from the said axis and delivering into the combustion chamber a fuel spray the mean direction of which makes an angle of less than 45° with a line parallel to the said axis.

3. An internal combustion engine of the liquid fuel injection compression ignition type, including in combination a cylinder, a cylinder head, a combustion chamber pocket formed in the cylinder head and communicating with the cylinder bore, said pocket having a cooled wall, a plug-like throat member mounted in the part of the pocket adjacent to the cylinder bore and having limited contact with the adjacent cooled wall, a second plug-like member mounted in the inner end portion of the pocket and substantially filling this inner end portion but having limited contact with the cooled wall of the pocket, approximately part-cylindrical recesses being formed in the adjacent faces of the two plug-like members so as together to form between the two plug-like members a combustion chamber of approximately cylindrical form while the plug-like throat member has a passage so formed therethrough as to constitute a communication between the cylinder bore and the combustion chamber through which air will be forced during the compression stroke in such a manner as to cause the air charge in the combustion chamber at the end of the compression stroke to be in a state of rotation about the axis of the combustion chamber, and a fuel injection device mounted in the cooled wall of the pocket and at a point substantially displaced from the axis of the cylindrical combustion chamber and serving to deliver into the combustion chamber a jet of fuel the mean direction of which makes an angle of less than 45° with a line parallel to the said axis.

4. An internal combustion engine of the liquid fuel injection compression ignition type, including in combination a cylinder, a cylinder head containing a substantially cylindrical combustion chamber pocket having cooled walls, a tubular liner lying in close proximity to but mainly out of contact with the circumferential wall of the pocket, a plug-like throat member rigidly mounted in the end of the tubular liner adjacent to the cylinder bore, the pocket, the liner and the throat member being so formed as to provide a combustion chamber having a substantially circular cross-section about an axis and a length measured along the axis which is at least two-thirds of its diameter, said chamber having a volume which is not less than 5/6 of the volume of a truly cylindrical chamber the length and diameter of which are equal respectively to the maximum length and maximum diameter of said combustion chamber, a communicating passage between the cylinder bore and the combustion chamber being so formed in the throat member that the air charge forced therethrough during the compression stroke will be heated and enter the combustion chamber in a direction which will cause the charge in the combustion chamber at the end of the compression stroke to be in a state of rotation as a whole about the said axis, and a fuel injection device mounted in a cooled wall of the pocket at a point substantially displaced from the said axis and delivering into the combustion chamber a fuel spray the mean direction of which makes an angle of less than 45° with a line parallel to the said axis.

5. An internal combustion engine of the liquid fuel injection compression ignition type, including in combination a cylinder, a cylinder head containing a substantially cylindrical combustion chamber pocket having cooled walls, a tubular liner lying in close proximity to but mainly out of contact with the circumferential wall of the pocket, a plug-like throat member rigidly mounted in the end of the tubular liner adjacent to the cylinder bore and out of contact with the cooled walls, the pocket, the liner and the throat member being so formed as to provide a combustion chamber of substantially cylindrical form with a length approximately equal to its diameter, a helical communicating passage between the cylinder bore and the combustion chamber being so formed in the throat member that the air charge forced therethrough during the compression stroke will be heated and enter the combustion chamber in a direction which will cause the charge in the combustion chamber at the end of the compression stroke to be in a state of rotation as a whole about the axis of said member, and a fuel injection device mounted in a cooled wall of the pocket at a point substantially displaced from said axis and delivering into the combustion chamber a fuel spray the mean direction of which makes an angle of less than 45° with a line parallel to the said axis.

HARRY RALPH RICARDO.